United States Patent [19]
Ortloff

[11] 4,391,298
[45] Jul. 5, 1983

[54] MULTILINE PIGGABLE FLUID SWIVEL
[75] Inventor: John E. Ortloff, Houston, Tex.
[73] Assignee: Exxon Production Research Co., Houston, Tex.
[21] Appl. No.: 221,738
[22] Filed: Dec. 31, 1980
[51] Int. Cl.³ .............................................. F16L 27/06
[52] U.S. Cl. .................................... 137/615; 137/580; 285/136; 285/190; 15/3.5; 15/104.06 R
[58] Field of Search ............... 285/136, 190; 137/580, 137/615, 236 S; 15/104.06 R, 3.5

[56] References Cited
U.S. PATENT DOCUMENTS

| | | | |
|---|---|---|---|
| 400,128 | 3/1889 | Shepherd | 251/326 |
| 2,411,044 | 11/1946 | Landrum et al. | 15/104.06 R |
| 3,228,611 | 1/1966 | Russell | 15/3.5 |
| 3,698,433 | 10/1972 | Dobler et al. | 285/136 |
| 4,106,748 | 8/1978 | Niino et al. | 251/133 |
| 4,126,336 | 11/1978 | Ortloff et al. | 285/136 |
| 4,174,127 | 11/1979 | Carn et al. | 285/190 |
| 4,183,559 | 1/1980 | Stafford et al. | 285/190 |
| 4,250,918 | 2/1981 | Tuson et al. | 137/580 |

Primary Examiner—A. Michael Chambers
Attorney, Agent, or Firm—Gary D. Lawson; Mitchell D. Lukin; Richard F. Phillips

[57] ABSTRACT

A piggable fluid swivel comprising a first element on which a second element is rotatably mounted. Grooves in both the first and second elements align to form a continuous flow passage between the elements. Openings are provided through the first and second elements and into the flow passage whereby fluid can enter through one element, flow through at least a portion of the flow passage, and then exit through the other element. A flow barrier means similar to a gate valve is provided on one of the elements and includes a baffle plate that is extendable between an open position and a closed position. In an open position, the elements can be easily assembled and disassembled. In a closed position, the baffle plate blocks backflow in the fluid passage which allows pressure to build behind any pig that may become stuck in the flow passage to free the pig and carry it from the swivel. The swivel may be coaxially stacked to provide a multiline piggable fluid swivel.

13 Claims, 7 Drawing Figures

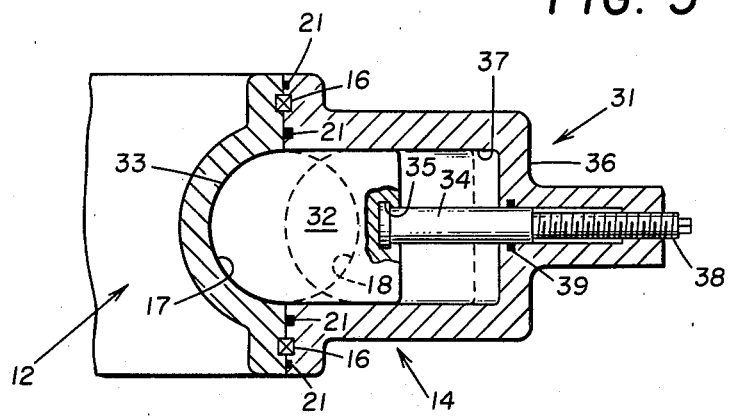
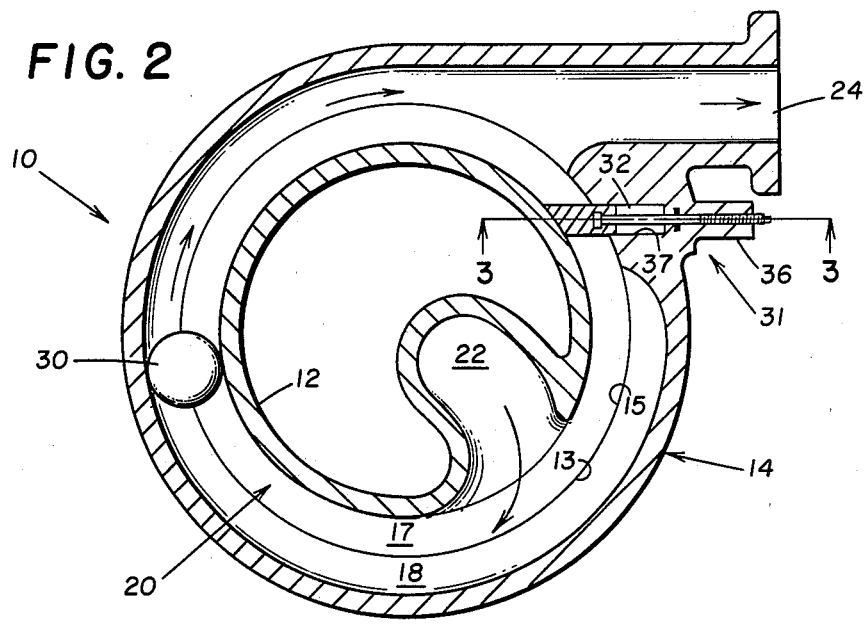

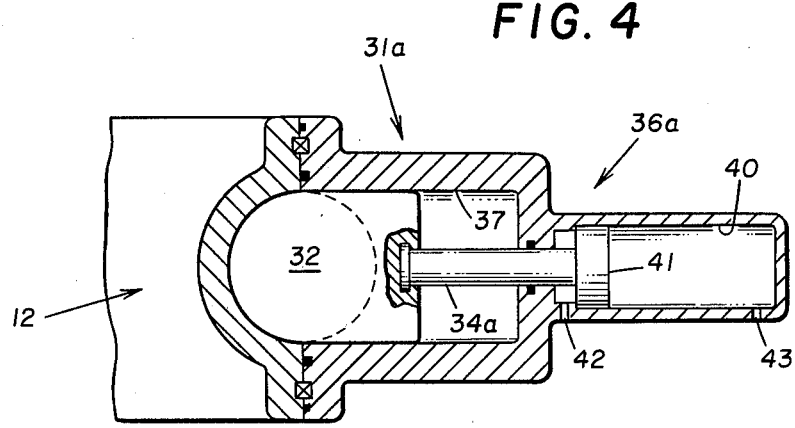
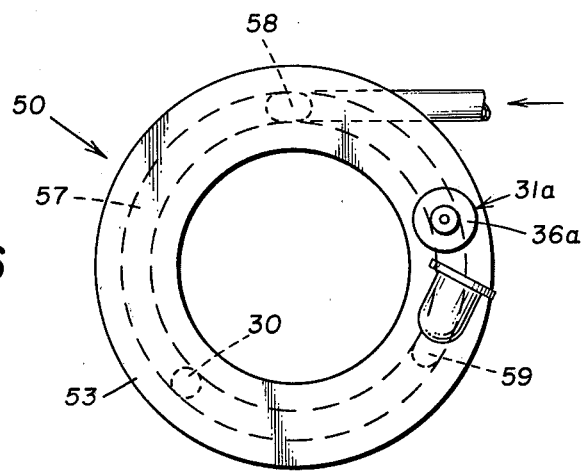
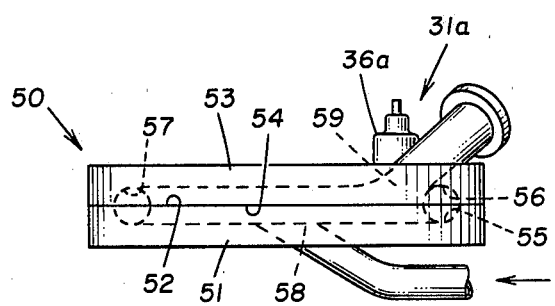

MULTILINE PIGGABLE FLUID SWIVEL

BACKGROUND OF THE INVENTION

1. Field of the Invention

The present invention relates to a fluid swivel and more particularly relates to a multiline piggable fluid swivel which allows a pig used for the removal of deposits from the inner walls of the fluid lines connected to the swivel to readily pass therethrough.

2. Description of the Prior Art

In the marine production and/or transportation of hydrocarbons and related products, it is common to use an offshore terminal to load/offload the hydrocarbons onto or off sea-going tanker vessels. Such offshore terminals are well known and are collectively referred to as single point moors. In carrying out such loading/offloading operations, a vessel is moored to the terminal and flowlines from the vessel are attached to corresponding flowlines on the terminal. Since it is well known that the wind and waves will normally cause a vessel to move (i.e. weathervane) about its mooring point, the flowlines need to be connected through a swivel mounted on the terminal so that the vessel may weathervane during the loading/offloading operations without snarling or damaging the flowlines. Further, since several fluids may be simultaneously loaded/offloaded, the swivel needs to accommodate a multitude of flowlines.

Multiline swivels of the type mentioned above are well known in the art, see, for example, U.S. Pat. Nos. 2,894,268; 3,082,440; 3,351,360; 3,698,433; 4,052,090; 4,111,467 and 4,126,336. However, many of the hydrocarbons (e.g. crude oil) loaded/offloaded through such swivels contain components such as wax or asphalt which can deposit and build up in the flow conduits of the swivel and on the interior walls of the flowlines connected to the swivel. Unless these deposits are routinely removed at desired intervals, flow through the flowlines and swivel may become severely impeded or blocked altogether.

It is common in the petroleum art to remove such deposits from ordinary flowlines by pumping a through-flowline-tool or "pig" through the lines which scrapes or dislodges the deposits from the flowlines so that the deposits are carried out of the lines by the fluids flowing therethrough. However, most multiline swivels of the types disclosed in the above cited patents are not designed to be piggable and will not permit a pig to be pumped therethrough without the risk of sticking the pig in the swivel. When such swivels are used in terminals through which deposit-forming fluids are loaded-/offloaded, operations have to be suspended at determined intervals so the flowlines can be pigged and the swivel can be disassembled and cleaned.

To avoid such timely and costly delays, swivels which are piggable, commonly referred to as piggable swivels, have recently been designed and proposed for use in such environments. For example, in U.S. Pat. No. 4,174,127 a piggable swivel is disclosed wherein a guide means is assembled through the outlet conduit of the swivel and projects into the flow path of the swivel to physically catch and direct the pig out of the swivel as it passes therethrough. Further, in U.S. Pat. No. 4,183,559, a piggable swivel is disclosed wherein the fluid path through the swivel is designed so that when the swivel is properly and precisely indexed, the pig can smoothly pass through the swivel.

SUMMARY OF THE INVENTION

The present invention provides a multiline piggable swivel which allows a pig to pass therethrough even when the swivel is in any of a wide range of different positions. Basically, each flow passage through the multiline swivel is provided with a flow barrier means which is movable back and forth between an open position and a closed position. When the barrier means is in its open position, the swivel can be easily assembled and/or disassembled. When the barrier means is in its closed position, fluid flow through the flow passage is blocked at that point thereby preventing backflow through the passage when and if a pig becomes stuck in the passage.

More specifically, the piggable fluid swivel is comprised of at least one first element such as a cylindrical core having an outer cylindrical surface thereon. A second element such as a cylindrical ring having an inner cylindrical surface is rotatably mounted onto the core so that the inner surface of the ring rotatably mates with the outer surface of the core. Both the outer surface of the core and the inner surface of the ring have respective circumferentially-extending grooves thereon which align to form a flow passage through the swivel.

An opening into the groove on the core and an opening into the groove on the ring provide for ingress and egress of fluid to and from the swivel. These openings enter the flow path at as smooth of angles, e.g. tangential to flow passage, as is possible. A fluid barrier means is provided on either the ring or the core and has structure similar to a gate valve in that a baffle plate is movable into and out of the flow passage of the swivel. When the barrier means is in an open position, the baffle plate is retracted sufficiently so that the ring can be positioned onto or removed from the core. When the barrier means is in a closed position, the baffle plate will fully extend into the flow passage to substantially block flow through the flow passage at that point.

To carry out a pigging operation, barrier means will be in its closed position. A pig enters either the opening in the core or the ring, flows through at least a portion of the flow passage, and exits through the other of the openings. If a pig gets stuck in the flow passage, the fluid can only backflow within the flow passage to the closed baffle plate. This permits pressure within the flow passage to build behind the stuck pig to free same. The barrier means may be left in its closed position even when pigging is not being carried out since the closed baffle plate will not interfere with normal flow through the swivel. The barrier means is normally opened only when the swivel is to be assembled or disassembled.

In the preferred embodiment, the present piggable swivels, as described above, can be coaxially stacked to provide a multiline piggable swivel. In another embodiment, a multiline piggable swivel is provided in accordance with the present invention which has a core element on which a plurality of spaced ring elements are rotatably mounted, each ring element constructed substantially as described above and each having a separate barrier means thereon which operates as previously described. Further, in still another embodiment of the present invention, the swivel is comprised of first and second cylindrical elements which rotate one on top the other.

BRIEF DESCRIPTION OF THE DRAWINGS

The actual construction, operation and apparent advantages of the present invention will be better understood by referring to the drawings in which like numerals identify like parts and in which:

FIG. 2 is a sectional view of the present swivel taken along line 2—2 of FIGS. 1 and 5;

FIG. 3 is an enlarged, sectional view of the actuating means for the flow barrier means taken along line 3—3 of FIG. 2;

FIG. 4 is a sectional view of a modified actuating means for the flow barrier means;

FIG. 6 is a plan view of another embodiment of the present piggable, fluid swivel; and FIG. 7 is an elevation view of the swivel of FIG. 6.

DESCRIPTION OF THE PREFERRED EMBODIMENTS

Figure 1:
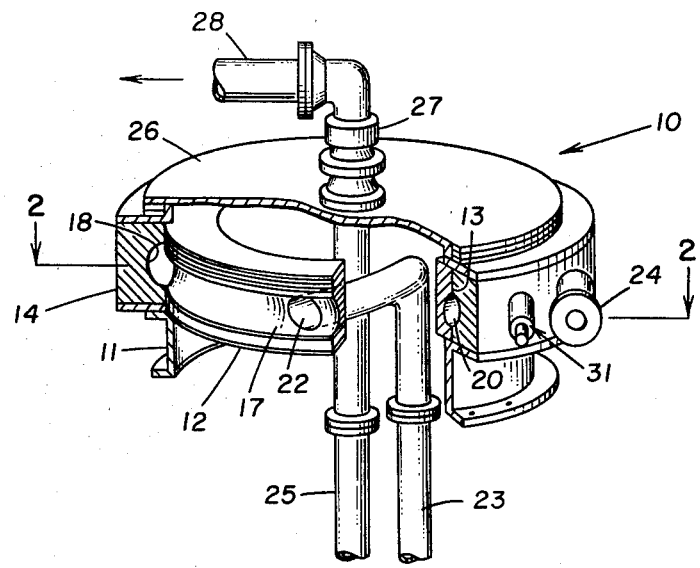
FIG. 1 is a perspective view, partly in section, of a piggable fluid swivel in accordance with the present invention.

Referring more particularly to the drawings, FIGS. 1-3 disclose fluid piggable swivel 10 which is comprised of a first or core element 12 having an outer surface 13. Core element 12 is mounted on support 11 which may be any structure on which a swivel of this type is employed, e.g. an offshore loading/offloading terminal such as a single point mooring facility. A second or ring element 14 having an inner surface 15 is concentrically mounted on core element 12 by means of bearings 16 (FIG. 3) or the like so that elements 12 and 14 are free to rotate relative to each other. Circumferential grooves 17 and 18 both having semi-circular cross-sections are provided on surfaces 13, 15, respectively, and are positioned so that when ring element 14 is assembled on core element 12, grooves 17 and 18 cooperate to form substantially circular, continuous fluid passage 20 in swivel 10. Seals 21, e.g. O-rings or, preferably, lip type seals, are provided (FIG. 3) between surfaces 13, 15, to prevent leakage from passage 20 as is understood in the art.

A first opening 22, normally functioning as the inlet for swivel 10, is provided through core element 12 into groove 17 and is adapted to be connected to an external source, e.g. fluid conduit 23 (FIG. 1). A second opening 24, normally functioning as the outlet for swivel 10, is provided through ring element 14 into groove 18 and is adapted to be connected to a second external source, e.g. a flowline (not shown). As shown in FIG. 2, both inlet 22 and outlet 24 are constructed so that each will enter or exit passage 20 at as flat of angle with respect thereto as is possible (i.e. as close to tangential as practical) so that pig 30 (described below) may easily and smoothly enter and exit passage 20.

As illustrated, swivel 10 also has a pipe 25 (FIG. 1) extending upward along the center axis of swivel 10 and out top plate 26. Pipe 25 is connected to conduit 28 through a conventional swivel 27 and normally provides a second fluid path through swivel 10. However, as understood in the art, pipe 25 could also be representative of an electric line, electric swivel, a cable, or similar element normally associated with swivels of this type.

The present description to this point describes the basic structure of a typical concentric fluid swivel of the type known in the art. However, it is considered impractical to attempt to pig such swivels, even those modified to have tangential inlets and outlets, since tests have shown that it is necessary to be able to build up pressure behind a pig to insure that it will pass completely through the swivel and will not become stuck in the flow passage of the swivel. As understood in the art, pigs used for this type of pigging operation are normally spherical or cylindrical in shape and are formed from an elastic material, e.g. neoprene rubber, etc. with a diameter slightly greater than the diameter of the flowlines to be pigged. The pigs are slightly compressed as they pass through the lines which insures that the pigs will remain in good contact with the flowline walls thereby dislodging the unwanted deposits. However, if the deposits are thick enough to substantially reduce the diameter of the flowline, there is a real possibility that a pig may become stuck. In a regular flowline, the pressure behind the stuck pig continues to build up until it is sufficient to free the pig.

However, as can be seen in FIG. 2, if pig 30 becomes stuck in flow passage 20 of a conventional concentric fluid swivel of the type described, the normal path for fluid flow (clockwise in FIG. 2) becomes blocked whereupon the fluid will merely backflow (counterclockwise in FIG. 2) to equalize the pressure across pig 30 before it flows out swivel 10 through outlet 24. Therefore, the pressure in passage 20 cannot build up sufficiently behind pig 30 to unstick pig 30 and the swivel must be disassembled to free the pig.

In accordance with the present invention, swivel 10 includes a fluid barrier means 31 which is movable between a retracted or open position, in which it permits easy assembly and disassembly of the swivel, and an extended or closed position in which it substantially blocks backflow of fluid in the fluid passage of the swivel. In its closed position, the barrier means 31 provides a means by which sufficient pressure may be built up to free a stuck pig.

More particularly, fluid barrier means 31, which is basically a gate valve, is comprised of baffle plate 32 having a semi-circular forward edge 33 which substantially conforms to the cross-sectional configuration of groove 17 (FIG. 3). Operating rod 34 is rotatably attached to the rear end of plate 32 by any suitable means, such as flange or shoulder 35 on rod 34 which is rotatably received in a slightly oversized, complementary recess in plate 32. Rod 34 is threaded at its other end and extends through housing 36 which, in turn, is preferably formed as an integral part of ring element 14. Housing 36 has a recess 37 which is adapted to receive baffle plate 32 when plate 32 is in its open position (shown by dotted lines in FIG. 3). The threaded end of rod 34 cooperates with threaded portion 38 of housing 36 whereby baffle plate 32 is moved back and forth between its open and closed positions by rotation of rod 34. Seal 39, e.g. O-ring, is positioned in housing 36 around rod 34 to prevent leakage from housing 36.

Although threaded rod 34 is the preferred means for operating baffle plate 32, it should be understood that other means may also be used to move baffle plate 32 between its open and closed positions. For example, FIG. 4 discloses a modified operating means for baffle plate 32 which comprises housing 36a having hydraulic chamber 40 therein. Rod 34a has piston 41 and seal 44 attached on the rear end thereof and positioned for slidable movement in chamber 40. Ports 42, 43 are provided into chamber 40 and are adapted to be connected to hydraulic source (not shown) to operate piston 41 as is understood in the art.

Still other actuating means, e.g. rack and pinion, ratchet mechanisms, etc., may be used to operate rod 34 and move baffle plate 32 between its open and closed positions without departing from the present invention.

In operation, ring element 14 is assembled and/or disassembled onto core element 12 with baffle plate 32 in its open or retracted position within recess 37 of housing 36. This allows ring element 14 to easily slip over core element 12 since the inner end 33 of plate 32 does not protrude beyond ring element 14 and does not interfere with the assembly or disassembly of swivel 10. Once swivel 10 is assembled, baffle plate 32 is moved to its closed position by actuating rod 34. Preferably, baffle plate 32 is bottomed in groove 17 and then backed off until it just clears groove 17. A minimal clearance is thus achieved between edge 33 of plate 32 and groove 17 which allows elements 12 and 14 to smoothly rotate relatively to each other but at the same time the clearance is small enough so as to provide any substantial bypass for fluid flow around plate 32. Barrier means 31, once closed, may be left closed even during normal loading/offloading operations since the closed position of means 31 will not interfere in any way with the normal flow of fluid through passage 20 of swivel 10 and will serve in some degree as a scraper to remove deposits from passage 20 whenever elements 12 and 14 rotate relative to each other.

When a pigging operation is to be carried out, barrier means 31 is in its closed position. The pigging operation can be carried out in all of the relative indexed positions between ring element 14 and core element 12 except that position where barrier means 31 is positioned directly adjacent inlet 22. In such an event, ring element 14 is rotated slightly to move baffle plate 32 to one side or the other of inlet 22. Pig 30 is then flowed into swivel 10 through inlet 22, through passage 20, and out outlet 24. If pig 30 becomes stuck, fluid can only backflow within passage 20 until it encounters baffle plate 32 which physically prevents it from flowing into outlet 24. This blockage of backflow allows fluid pressure to build behind stuck pig 30 to free same and carry it out of swivel 10 along its normal path through outlet 24. Further, if the need arises, swivel 10 may also be pigged in a reverse direction wherein pig 30 enters through outlet 24 (now the inlet) and exits through inlet 22 (now the outlet).

Housing 36 is shown as preferably being positioned on second or ring element 14 adjacent outlet 24 and constructed so that baffle plate 32 moves between its open and closed positions along a path which is substantially parallel to the outlet. This positioning and construction of housing 36 is considered to be most practical in allowing ease of operation in the majority of applications where swivel 10 is likely to be used. However, it should be recognized that housing 36 can be positioned at other points on ring element 14 or can be positioned on core element 12 without departing from the present invention. It is only necessary that baffle plate 32 be movable to an open position to allow assembly and disassembly of swivel 10 and be movable to a closed position to substantially block fluid flow through passage 20. Likewise, housing 36 can be constructed so that its axis lies on lines other than that parallel to outlet 24, e.g. on a radius of concentric elements 12, 14, whereby baffle plate 32 would move between its open and closed positions along a path different than that shown. Again, it is only necessary that baffle plate 32 be capable of being retracted sufficiently in recess 37 of housing 36 to completely clear groove 17 and be capable of being extendable to substantially block flow through flow passage 20.

Figure 5:
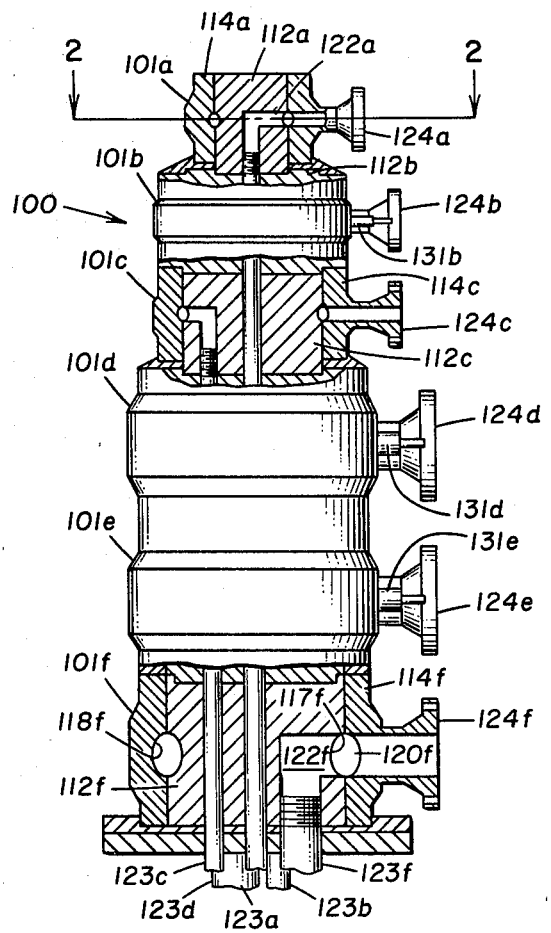
FIG. 5 is a perspective view, partly in section, of a multiline, piggable fluid swivel in accordance with the present invention.

Although it will be recognized that a plurality of piggable fluid swivels 10 can be coaxially stacked one on another to provide a multiline piggable swivel, a preferred multiline piggable swivel 100 in accordance with the present invention is shown in FIG. 5. Swivel 100 is comprised of a plurality of modules (six shown) 101a-f which are vertically stacked and mounted together. Each module, e.g. 101a, is comprised of a first or core element 112a and a second or ring element 114a rotatably mounted thereon. Each core element and ring element combination, e.g. 112f, 114f, has circumferentially extending grooves, e.g. 117f, 118f, respectively, therein which form a flow passage, e.g. 120f, through their respective module. A plurality of flowlines 123a-f extend upward through respective core elements 112 and are connected to their respective inlets 122a-f. In accordance with the present invention, each ring element 114a-f has a tangential outlet 124a-f, respectively. For a more detailed description of the structure of swivel 100 and its normal operation, reference is made to U.S. Pat. No. 4,126,336 which is incorporated herein by reference.

Each module 101a-f of swivel 100 has a fluid barrier means 131 (only three shown; 131b, 131d, 131e) on its respective ring element 114a-f. Each fluid barrier means 131 is identical in structure and operation as that of fluid barrier means 31 described in detail above. It can be seen that a separate pigging operation can be carried out through each flowline 123a-f through its respective swivel module 101a-f in the same manner as fully described above.

A further embodiment of the present invention is disclosed in FIGS. 6 and 7 wherein piggable swivel 50 is comprised of a first or lower element 51 having a first surface 52 thereon. Second or upper element 53 a second surface 54 is rotatably mounted onto lower element 51 by means of bearings (not shown) or the like. Surface 52 has a circularly extending groove 55 of semi-circular cross-section provided therein which aligns with an identical groove 56 in surface 54 to define fluid passage 57 through swivel 50. Seal means (not shown), e.g. O-rings or lip type seals, are properly positioned between elements 51, 53 to prevent leakage from passage 57. A first opening 58, normally the inlet, is provided through lower element 51 into passage 57 and a second opening 59, normally the outlet, is provided through upper element 53 into passage 57. Both openings enter passage 57 at a smooth angle and are preferably flared to allow smooth entry and exit of a pig during pigging operations.

Fluid barrier means 31a is shown as being positioned on upper element 53 but it should be understood that means 31a can equally as well be positioned on bottom element 51. The construction and operation of flow barrier means 31a is identical to that of flow barrier means 31 (see FIG. 3) as fully described above. It is understood that the baffle plate (not shown) of means 31a will be received into a recess within housing 36a when in open position so that it completely clears groove 55 and will extend into groove 55 when in a closed position to substantially block flow through passage 57. With means 31a in a closed position during a pigging operation, if pig 30 (FIG. 6) becomes stuck, backflow from inlet 58 will be blocked by means 31a allowing pressure to build behind pig 30 to free same and carry it out of swivel 50 through outlet 59. Where conditions allow swivel 50 to be assembled and/or disassembled by merely moving elements 51, 53 directly toward or away from each other, there will be no need to move means 31a to an open position. However, if swivel 50 must be assembled and/or disassembled by sliding elements 51, 53 one onto the other, then means 31a will have to be moved to an open position.

Various modifications and alterations of this invention will become apparent to those skilled in the art without departing from the scope and spirit of this invention, and it should be understood that this invention is not to be unduly limited to that set forth herein for illustrative purposes.

What is claimed is:

1. A piggable fluid swivel comprising:
    a first element having a first surface;
    a second element rotatably mounted on said first element so that said first and second elements rotate with respect to one another about a common axis, said second element having a second surface which rotatably mates with said first surface of said first element;
    a continuous fluid passage in said swivel defined by a first groove in said first surface and a second groove in said second surface which align opposite each other when said first and second elements are assembled;
    seal means for preventing flow from said fluid passage between said first and second surfaces;
    a first opening through said first element into said first groove to provide fluid communication between the exterior of said swivel and said fluid passage;
    a second opening through said second element into said second groove to provide fluid communication between the exterior of said swivel and said fluid passage; and
    fluid barrier means mounted on one of said elements for substantially blocking fluid flow in said continuous flow passage at the point of said barrier means, said fluid barrier means comprising:
        a housing on said one of said elements having a recess therein which opens into said groove of said one of said elements;
        a baffle plate slidably positioned in said recess and being movable between (a) an open position wherein said baffle plate is sufficiently retracted within said recess so that substantially no part of said baffle plate extends into said groove on said one of said elements and (b) a closed position wherein said baffle plate sufficiently extends from said recess into said other groove on said other element to substantially block fluid flow through said continuous passage past said baffle plate, said baffle plate movement occurring substantially along a straight line coinciding with the longitudinal axis of said baffle plate, said baffle plate having a sealing edge conforming to a corresponding portion of said other groove on said other element, whereby in response to said baffle plate being in said closed position, said continuous fluid passage is substantially completely sealed from fluid flow past said baffle plate; and
        means in said housing for moving said baffle plate back and forth between said open and closed positions.

2. The piggable fluid swivel of claim 1 wherein said means for moving said baffle plate comprises:
    a rod rotatably connected at one end of said rod to one end of said baffle plate, said rod being threaded on its other end, said rod extending through said housing, said housing having a threaded portion cooperating with said threaded end of said rod so that rotation of said rod moves said baffle plate between said open and closed positions substantially along an axis of movement corresponding to the longitudinal axis of said rod and said baffle plate.

3. The piggable fluid swivel of claim 1 wherein said means for moving said baffle plate comprises:
    a hydraulic chamber defined in said housing above said recess;
    a rod rotatably connected at one end of said rod to one end of said baffle plate and having its other end extending into said hydraulic chamber;
    a piston affixed to said other end of said rod and slidably positioned in said hydraulic chamber; and
    parts in said hydraulic chamber adapted to be corrected to a hydraulic source for moving said piston back and forth within said chamber.

4. The piggable fluid swivel of claim 1 wherein said fluid barrier means is mounted on said second element.

5. The piggable fluid swivel of claim 1 wherein said fluid barrier means is mounted on said first element.

6. The piggable fluid swivel of claim 1 wherein said first element is a core element with said first surface being the cylindrical outer surface thereof and wherein said second element is a ring element with said second surface being the inner cylindrical surface thereof.

7. The piggable swivel of claim 1 wherein said first element comprises:
    a first cylindrical element and said first surface comprises the upper surface of said first cylindrical element; and wherein
    said second element comprises a second cylindrical element and said second surface comprises the lower surface of said second cylindrical element.

8. A multiline piggable fluid swivel comprising:
    a cylindrical core element having a plurality of spaced circumferential surfaces thereon, each of said plurality of spaced surfaces having a continuous, circumferentially-extending groove thereon;
    a plurality of ring elements respectively rotatably mounted on said plurality of spaced surfaces, each of said plurality of ring elements having an inner surface which in turn has a continuous, circumferentially-extending groove thereon which aligns opposite said groove on its said respective spaced circumferential surface to define a continuous flow passage between said core and its respective ring element;
    a plurality of spaced openings in said core element opening respectively into said grooves on said plurality of spaced circumferential surfaces;
    a plurality of flowpaths in said core connected respectively to said plurality of spaced openings;
    an opening in each of said plurality of ring elements opening into said groove of said ring elements; and
    a flow barrier means on at least one of said ring elements; said barrier means comprising:

a housing on said ring element having a recess therein which opens into said groove of said ring element;

a baffle plate slidably positioned in said recess and being movable between (a) an open position wherein said baffle plate is substantially completely retracted within said recess so that in response to said baffle plate being in said open position substantially no part of said baffle plate is subjected to the erosive action of fluid flowing through said flow passage, and (b) a closed position wherein said baffle plate sufficiently extends from said recess into the corresponding groove on said core element to substantially block fluid flow through said continuous passage past said baffle plate, said baffle plate movement occurring substantially along a straight line coinciding with the longitudinal axis of said baffle plate, said baffle plate having a sealing edge conforming to a corresponding portion of said core element groove such that in response to being in said closed position, said baffle plate seals said flow passage against fluid flow proximate said baffle plate; and means for moving said baffle plate back and forth between said open and closed positions.

9. The piggable fluid swivel of claim 8 wherein said means for moving said baffle plate comprises:
a rod rotatably connected at one end of said rod to one end of said baffle plate, said rod being threaded on its other end, said rod extending through said housing, said housing having a threaded portion cooperating with said threaded end of said rod so that rotation of said rod moves said baffle date between said open and closed positions substantially along an axis of movement corresponding to the longitudinal axis of said rod and said baffle plate.

10. The piggable fluid swivel of claim 8 wherein said means for moving said baffle plate comprises:
a hydraulic chamber defined in said housing above said recess;
a rod rotatably connected at one end to said baffle plate and having its other end extending into said hydraulic chamber;
a piston affixed to said other end of said rod and slidably positioned in said hydraulic chamber; and
ports in said hydraulic chamber adapted to be connected to a hydraulic source for moving said piston back and forth within said chamber.

11. A piggable fluid swivel comprising:
first and second elements rotatably mounted relative to one another, a continuous fluid passage being defined between the juxtaposed surfaces of said elements;

fluid barrier means mounted on one of said elements for substantially blocking fluid flow in said continuous flow passage at the point of said barrier means, said barrier means comprising:
a housing on said one of said elements having a recess therein which opens in said groove of said one of said elements;
a baffle plate slidably positioned in said recess and being movable between (a) an open position wherein said baffle plate is sufficiently retracted within said recess such that no part of said baffle plate extends substantially into said continuous fluid passage and (b) a closed position wherein said baffle plate sufficiently extends from said recess into said other groove on said other element to substantially block fluid flow through said continuous passage past said baffle plate, said baffle plate having a sealing edge conforming to a corresponding portion of said other groove on said other element so that in response to being in said closed position, said baffle plate seals said flow passage against fluid flow proximate said baffle plate, said baffle plate movement occurring substantially along a straight line coinciding with the longitudinal axis of said baffle plate; and means for moving said baffle plate back and forth between said open and closed positions.

12. The piggable fluid swivel of claim 11 wherein said means for moving said baffle plate comprises: a rod rotably connected at one end of said rod to one end of said baffle plate, said rod being threaded on its other end, said rod extending through said housing, said housing having a threaded portion cooperating with said threaded end of said rod so that rotation of said rod moves said baffle plate between said open and closed positions substantially along an axis of movement corresponding to the longitudinal axis of said rod and said baffle plate.

13. The piggable fluid swivel of claim 11 wherein said means for moving said baffle plate comprises:
a hydraulic chamber defined in said housing above said recess;
a rod rotatably connected at one end of said rod to one end of said baffle plate, and having its other end extending into said hydraulic chamber;
a piston affixed to said other end of said rod and slidably positioned in said hydraulic chamber; and
parts in said hydraulic chamber adapted to be corrected to a hydraulic source for moving said piston back and forth within said chamber.

* * * * *